United States Patent [19]

Yokoyama et al.

[11] Patent Number: 4,814,195

[45] Date of Patent: Mar. 21, 1989

[54] REDUCED CALORIE PEANUT BUTTER PRODUCT

[75] Inventors: Wallace H. Yokoyama, Whittier; Mark S. Fraser, Fullerton; Lakho L. Khatri, Walnut, all of Calif.

[73] Assignee: Winters Canning Co., Fullerton, Calif.

[21] Appl. No.: 28,614

[22] Filed: Mar. 20, 1987

[51] Int. Cl.$^4$ .................................................. A23L 1/38
[52] U.S. Cl. .................................. 426/633; 426/658; 426/804
[58] Field of Search ............... 426/804, 658, 633, 548, 426/632

[56] References Cited

U.S. PATENT DOCUMENTS

| | | | |
|---|---|---|---|
| 3,127,272 | 3/1964 | Baker et al. | 426/324 |
| 3,140,953 | 7/1964 | Roberts | 426/633 |
| 3,216,830 | 11/1965 | Melnick | 426/633 |
| 3,580,729 | 5/1971 | Darragh et al. | 426/633 |
| 3,876,794 | 4/1975 | Rennhard | 426/548 |
| 3,882,254 | 5/1975 | Gooding | 426/633 |
| 4,034,121 | 7/1977 | Dunn et al. | 426/565 |
| 4,042,714 | 8/1977 | Torres | 426/62 |
| 4,232,052 | 11/1980 | Nappen | 426/601 |
| 4,247,568 | 1/1981 | Carington et al. | 426/321 |
| 4,304,768 | 12/1981 | Staub et al. | 426/558 |
| 4,363,763 | 12/1982 | Peterson | 260/410.7 |
| 4,364,967 | 12/1982 | Black | 426/632 |
| 4,379,782 | 4/1983 | Staub et al. | 426/558 |
| 4,469,635 | 9/1984 | Peterson | 260/403 |
| 4,504,513 | 3/1985 | Black | 426/632 |
| 4,508,746 | 4/1985 | Hamm | 426/601 |
| 4,622,233 | 11/1986 | Torres | 426/804 |
| 4,668,519 | 5/1987 | Dartey et al. | 426/548 |
| 4,728,526 | 3/1988 | Avera | 426/633 |

FOREIGN PATENT DOCUMENTS 2007961  3/1982  United Kingdom .
2007961B 3/1982  United Kingdom .

OTHER PUBLICATIONS

"Low Calorie Bulking Agents," J. J. Beereboom, CRC Critical Review in Food Science and Nutrition, p. 401, May, 1979.

"Preparation and Evaluation of Trialkoxytricarballylate, Trialkoxycitrate, Trialkoxyglycerylether, Jojoba Oil and Sucrose Polyester as Low Calorie Replacements of Edible Fats and Oils," D. J. Hamm, Journal of Food Science, vol, 49, p. 419, 1984.

*Primary Examiner*—Donald E. Czaja
*Assistant Examiner*—Celine T. Callahan
*Attorney, Agent, or Firm*—Pretty, Schroeder, Brueggemann & Clark

[57] ABSTRACT

A reduced calorie peanut butter product containing from about 15 to about 40% by weight of a solid bulking agent having from 0 to about 3 calories per gram, an oil-binding capacity from about 20 to about 45%, and a particle size less than about 50 microns. Preferred solid bulking agents are polydextrose and microcrystalline cellulose. The polydextrose is preferably neutralized by a compound containing calcium or magnesium. The microcrystalline cellulose preferably comprises aggregates having a particle size from about 5 to about 35 microns. Mixtures of the polydextrose and the microcrystalline cellulose may be used.

32 Claims, No Drawings

REDUCED CALORIE PEANUT BUTTER PRODUCT

BACKGROUND OF THE INVENTION

Peanut butter is a popular, highly nutritious food prepared by shelling, roasting, and, preferably, blanching peanuts before grinding them to a uniform creamy consistency. Certain optional ingredients are generally added to the ground peanuts, such as a sweetener, salt, and hydrogenated vegetable oil. The hydrogenated vegetable oil is a stabilizer added to most commercial peanut butters to prevent separation of an oil phase. Such peanut butters require the additional processing steps of mixing the finely ground peanuts while hot with the stabilizer and the sugar and salt, if added, and then cooling the mixture by passing it through a heat exchanger to obtain a material which solidifies shortly after filling into jars to the typical peanut butter consistency.

To be labelled a "peanut butter" under the applicable regulations of the Food and Drug Administration, the peanut ingredients must comprise at least 90% of the weight of the finished product, 21 CFR Section 164.150. If more than 10% of the peanut product consists of nonpeanut ingredients, then the product is termed a "peanut spread," 21 CFR Section 102.23(a), so long as it meets all of the conditions set forth in 21 CFR Section 102.23(b) to be considered nutritionally equivalent to peanut butter. However, if the peanut spread is nutritionally inferior to peanut butter, then it must be labelled an "imitation peanut butter," 21 CFR Section 102.23(b). "Crunchy" peanut butters contain substantial added quantities of peanut fragments. When only peanuts, sugar and salt are used, the peanut butter is generally designated as a "Natural" or "Old-Fashioned" peanut butter. The term "peanut butter product" as used herein is intended to include peanut butters, peanut spreads, and imitation peanut butters, whether creamy, crunchy, old-fashioned, or natural.

Peanut butter is a highly nutritious food containing high levels of protein. However, peanut butter also contains relatively large quantities of fat. Thus, peanut butter's appeal as a protein source is offset by its high calorie content, i.e., about 592 calories per one hundred grams. The commercial attractiveness of a reduced calorie peanut butter product has long been recognized by the industry since reducing one's calorie intake generally would be desirable and beneficial to the consumer. However, even though the fat in peanut butter comprises about 72% of its total calories, only a limited reduction in calories can be obtained by reducing the percentage of fat. For example, even if all of the fat was eliminated, the calorie content of the carbohydrates and protein therein results in a total reduction in calories of about 43%. Moreover, if more than about 50% of the fat in peanut butter is removed, the resulting product becomes very stiff. Upon further removal of fat, the peanut butter product is no longer a paste but becomes a powder. Since a fat content of 35% corresponds to only about a 14% reduction in calories per gram, it can be seen that substituting even moderate calorie-containing materials, such as partially defatted peanuts or low or no fat peanut flour, for the fat content above 35% provides only a very modest decrease in the calorie content of such peanut butter products. Moreover, this modest reduction is achieved at the expense of extensive additional processing and a stiffer, more adhesive product.

One of the most common methods for effectively decreasing the amount of calories per unit volume in a food product is the addition of water as a non-calorie ingredient together with a thickener or emulsifier to duplicate the texture of the original product. However, water adversely affects the flavor, color, texture and mouthfeel of peanut butter products. In addition, unlike peanut butter which is microbiologically stable at room temperature because it is a fat-based food product containing very small quantities of water, generally about 1-2% by weight, and has a low level of water activity, water-based products generally must be refrigerated after opening or contain preservatives to retard spoilage. Although many other methods of reducing calories in water-based foods are known, such methods are also not acceptable for fat-based food products such as peanut butter.

An alternate approach that has been tried to reduce the amount of calories in peanut butter included the use of commercially available cellulose, such as AVICEL ® microcrystalline cellulose, as a noncalorie bulking agent. Such commercially available cellulose materials are capable of absorbing considerable quantities of liquid vegetable oil, generally on the order of more than 1.5 grams of oil per gram of cellulose. Because the usual texture (i.e., smoothness, consistency, and mouthfeel) of commercial peanut butters depends in part upon the presence of substantial amounts of liquid peanut oil, the quantities of oil-binding materials that can be used, such as commercially available cellulose materials, are severly restricted. Consequently, only a limited reduction in calories can be obtained in this manner.

Thus, it can be seen that because a reduced calorie peanut butter product must achieve the calorie reduction without substantially altering the textural and flavor attributes of a peanut butter product, attempts to develop a method for significantly reducing calories in peanut butter products have been unsuccessful to date.

Accordingly, it is an object of this invention to provide a reduced calorie peanut butter product.

It is another object of this invention to provide a reduced calorie peanut butter product that does not substantially alter the textural and flavor attributes of a typical commercial peanut butter.

It is a further object of the invention to provide a reduced calorie peanut butter product by adding non- or low-calorie solid bulking agents to a peanut butter, peanut spread, or imitation peanut butter.

SUMMARY OF THE INVENTION

The present invention provides a reduced calorie peanut butter product that is lower in calories than conventional peanut butters, peanut spreads or imitation peanut butters. This reduction in calories is obtained using ground non-defatted peanuts, that is, without the separate removal of any of the natural peanut oils or fats which would deleteriously affect the texture and flavor characteristics of the peanut butter product. The term "reduced calorie" as used herein means that the calorie content of the peanut butter product of the present invention is at least 15% less than the calorie content of an equivalent serving of peanut butter. The reduction in calories is achieved by adding one or more non- or low-calorie solid bulking agents, such as polydextrose or microcrystalline cellulose, to the peanut butter product. The solid bulking agent may comprise from about 15 to about 40% by weight of the reduced calorie peanut butter product, preferably has less than about 3 calories per gram, an oil-binding capacity from about 20 to about 45%, and a particle size no greater than about 50 microns. When both polydextrose and microcrystalline cellulose are added to form a reduced calorie peanut butter product of the present invention, the polydextrose comprises from about 7 to about 27% by weight and the microcrystalline cellulose comprises up to about 20% y weight.

Preferably, when polydextrose and microcrystalline cellulose, or both, are used as the solid bulking agents, they are specially modified for purposes of the present invention to provide improved textural and flavor characteristics when added to the peanut ingredients. The polydextrose is preferably neutralized by a hot melt process using a neutralizing agent selected from the group consisting of calcium hydroxide, calcium carbonate, calcium oxide, magnesium hydroxide, magnesium carbonate, and magnesium oxide. From a sensory standpoint, polydextrose neutralized by such a process has a clean, slightly sweet taste with no metallic or bitter flavors. The microcrystalline cellulose particles are agglomerated to form smooth-surfaced aggregates having a substantially increased effective particle size and effectively decreased oil-binding capacity. In addition, the neutralized polydextrose particles and the microcrystalline cellulose particles used herein most preferably have a particle size from about 5 microns to about 35 microns and an average particle size of from about 5 to about 13 microns.

DETAILED DESCRIPTION OF THE INVENTION

The rheological properties of a peanut butter product depend largely upon the ratio of the volume of liquid, i.e., peanut oil, to the volume of solids. The addition of solid bulking agents to form the reduced calorie peanut butter product of the present invention changes this ratio and, hence, affects the rheological properties of the resulting product. This influence on the rheological properties of the reduced calorie peanut butter of the present invention becomes increasingly noticeable as the amount of the solid bulking agent is increased to achieve a greater reduction in calories. Thus, the physical properties of the solid bulking agents are important to realizing textural and flavor attributes in the reduced calorie peanut butter product of the present invention that substantially correspond to those in peanut butter. Foremost among these properties are particle size, oil-binding capacity, and density. In addition, the solid bulking agent is preferably either tasteless or has a relatively bland taste, and it should contribute only an insignificant number of calories to the reduced calorie peanut butter product, preferably less than about 3 calories per gram, and most preferably from 0 to about 1 calorie per gram.

One of the most important textural attributes in a peanut butter product is its smoothness which can be directly related to the particle size of the solid ingredients. Based upon tests by trained sensory panels, it has generally been determined that as the percentage of particles having particle sizes greater than 50 microns increase, the perceived smoothness of the peanut butter product decreases. Thus, larger particle sizes are perceived by the sensory panel as imparting "grittiness" to the peanut butter product, an especially undesirable feature for a food product that ideally is smooth in texture. Consequently, smaller particles are desirable for a perception of a creamy and smooth mouthfeel. However, particles having a particle size less than about 5 microns cause the viscosity to increase due to increases in surface area. This increased viscosity is undesirable in manufacturing the reduced calorie peanut butter product of the present invention. It has been determined that for purposes of the present invention, particles of the solid bulking agents having a particle size of about 35 microns are particularly preferred with measurable amounts of particles greater than about 35 microns or less than about 5 microns to be avoided. Although a narrow distribution of particles having a particle size of about 35 microns is particularly preferred, it must be recognized that the physical process of manufacturing particles always gives a broad distribution, whether normal, Gaussian or skewed, and that the specific particle size also depends upon how the solid bulking agent is ground and air classified. The particle size distributions described herein were determined using a Leeds and Northrup Microtrac laser-type particle counter. It is, therefore, particularly preferred that the solid bulking agent particles used in the present invention have an average particle size of about 5 to about 13 microns without measurable amounts of particles greater than about 35 microns or less than about 5 microns when ground and air classified regardless of whether the particles are ground and classified in one or separate steps. However, if the solid bulking agent is insoluble in water, which means that it will remain on the tongue longer, then preferably the maximum particle size is about 22 microns with an average particle size of about 5 microns. In addition, it should be pointed out that the above particle sizes apply to the particles of the solid bulking agent as actually used in the reduced calorie peanut butter product of the present invention. Thus, such particle sizes also describe the particle sizes of the solid bulking agent after any additional grinding steps when the solid bulking agent particles are combined with the ground peanuts or other ingredients.

The consistency of a peanut butter product is also related to its viscosity which depends, in large measure, upon its oil content. If particles of the solid bulking agent "capture" or absorb large amounts of oil, referred to herein as its oil-binding capacity, the viscosity of the reduced calorie peanut butter product will increase until eventually a powder will result. The term "oil-binding capacity" as used herein refers to the percentage of oil contained within a given amount of oil-containing solid bulking agent, such oil-containing solid bulking agent having been prepared by mixing the solid bulking agent with an excess of oil and then removing unbound, free oil by centrifugation. Accordingly, the solid bulking agents used in the reduced calorie peanut butter product of the present invention preferably absorb or immobilize only small amounts of oil, if any, within the crevices of the individual particles. Preferably, the solid bulking agents used herein have an oil-binding capacity from about 20 to about 45%.

In addition to the calorie content, particle size, and oil-binding capacity of the solid bulking agent, it is also beneficial that the solid bulking agent have a density between from about 1.3 to about 1.6 g/cm$^3$. This is because the density of the reduced calorie peanut butter products of the present invention should be similar to that of commercial peanut butters. The density of the solid bulking agent becomes increasingly significant as the amount of solid bulking agent increases and approaches 40% by weight as such amounts could affect the volume per unit weight of the reduced calorie peanut butters if the density is less than about 1.3 g/cm$^3$ or greater than about 1.6 g/cm$^3$. Accordingly, solid bulking agents having a density less than 1.3 or greater than 1.6 g/cm$^3$ are of limited usefulness.

When combined with ground peanuts and the other ingredients used to form the reduced calorie peanut butter products of the present invention, the solid bulking agents comprise from about 15 to about 40% by weight of the resulting product. If more than about 40% by weight of the solid bulking agent is used, the resulting peanut butter product will be hard, pasty, and unspreadable. If less than about 15% by weight is used, the calorie reduction will be less than 15% as shown in Table 1 below. The amount of solid bulking agent used generally corresponds to a composition of about 70 to about 75% by weight solids and about 25 to about 30% by weight peanut oil. The actual amount of solid bulking agent necessary to reach a given caloric reduction target is dependent upon the calorie content of the solid bulking agent as shown in Table 1:

TABLE 1

| Bulking Agent, Cal/g | Weight Percent of Solid Bulking Agent Having A Density of 1.4 g/cm$^3$ and Negligible Oil-Binding Capacity to Achieve Calorie Reduction | | | | | | |
|---|---|---|---|---|---|---|---|
| | Calorie Reduction, % | | | | | | |
| | 15% | 20% | 25% | 30% | 35% | 40% | 45% |
| 0.0 | 14.4 | 19.4 | 24.0 | 29.2 | 34.1 | 39.0 | 43.9 |
| 0.5 | 15.8 | 21.2 | 26.5 | 31.9 | 37.3 | 42.6 | |
| 1.0 | 17.4 | 23.3 | 29.2 | 35.2 | 41.1 | 47.0 | |
| 2.0 | 21.8 | 29.3 | 36.8 | 44.1 | | | |
| 3.0 | 29.4 | 39.4 | 49.3 | | | | |

Thus, for example, as shown in Table 1, in order to achieve a twenty-five percent (25%) reduction in calories, 24.0% by weight of a solid bulking agent having 0 calories per gram must be used, or 29.2% by weight of a solid bulking agent having 1.0 calories per gram.

Polydextrose is particularly suited for use as a solid bulking agent in the reduced calorie peanut butter product of the present invention. In general, polydextrose particles are of suitable density and have a smooth surface so that little oil is absorbed or immobilized. Since polydextrose has a calorie content of about 1.0 calories per gram, Table 1 shows that a reduced calorie peanut butter product containing about 40% by weight polydextrose will achieve a calorie reduction of approximately one-third (33⅓%). In general, polydextrose is commercially available from Pfizer Inc. in two forms, polydextrose A and polydextrose N. An insoluble form of polydextrose having a molecular weight greater than about 5,000 can also be made under reaction conditions similar to those of polydextrose A as shown in U.S. Pat. No. 3,876,794. Since the insoluble polydextrose is characterized by low water-absorbing (osmophilicity) capability, it should be particularly suited to the reduced calorie peanut butter product of the present invention.

Polydextrose A is a solid powder having sufficient residual citric acid (approximately 0.1%) to produce an aqueous solution having a pH of 2 to 3. Due to its sour, lemony flavor, generally believed to be caused by the residual citric acid, it is not acceptable for the reduced calorie peanut butter product of the present invention because this "lemon" off-flavor detracts from the peanut butter flavor. Although the strong "lemon" off-flavor of the residual citirc acid in polydextrose A may be controlled by the addition of a food grade base, i.e., sodium bicarbonate or sodium phosphate, dibasic, to bring the pH of a 10% aqueous solution to about 5 or 6, the salty, bitter taste of such a resulting product, albeit a milder flavor than that of polydextrose A, is similarly undesirable for the reduced calorie peanut butter products of the present invention. In addition, the polydextrose A that is commercially available contains particle sizes which are large enough to impart a "grittiness" to the texture of a peanut butter product.

Polydextrose N is a 70% aqueous solution of polydextrose A which has been neutralized to a pH of 5-6 with potassium hydroxide. However, this amount of water is unsatisfactory and incompatible with a fat-based food product such as peanut butter. Before polydextrose N could be used in a peanut butter product, a major portion of the water would have to removed from a compound that is very hydrophilic. In addition, the commercially available polydextrose N has a decidedly strong metallic or bitter flavor believed to be caused by the potassium ion.

When adjusted to a pH of about 5 or 6 by neutralization, polydextrose by itself is slightly sweet. To avoid the secondary flavors resulting from the neutralization process when phosphates or potassium compounds are used, the polydextrose A used in the reduced calorie peanut butter products of the present invention is neutralized with calcium or magnesium compounds. The preferred neutralizing agents are selected from the group consisting of calcium hydroxide, calcium carbonate, calcium oxide, magnesium hydroxide, magnesium carbonate, and magnesium oxide. While the mechanism for the removal of the lemon off-flavor is not fully understood, it is believed that in addition to the neutralization effect, the calcium or magnesium ions bind the citrate ion.

Since there is insufficient moisture in fat-based foods such as peanut butter products to form a solution in which the neutralization of polydextrose A could occur by the addition of a base, the polydextrose A must be neutralized prior to its incorporation into the reduced calorie peanut butter products of the present invention. A dry, neutralized polydextrose that is virtually tasteless except for a slightly sweet taste can be obtained economically and rapidly by a melt neutralization process. For example, the neutralizing agent and the granular polydextrose A are first mixed together in the proper proportions, such as by ribbon blending, for about one-half to about two hours. This mixture is then introduced into a continuous processor, such as the type manufactured by Teledyne-Readco, which uses paddles to further mix these ingredients and then feeds the homogeneous mixture via a screw conveyor through a heated cylinder. The processor is controlled at a temperature of about 300 degrees Fahrenheit which is sufficient to melt the polydextrose and dissolve the neutralizing agent. These molten conditions are maintained in the processor so that substantial neutralization will take place. The polydextrose/neutralizing agent solution is then fed through the processor at a sufficient rate so that the extruded product appears to be a clear glass, e.g., about 350 pounds per hour in a five inch diameter machine. A cloudy glass indicates the undesirable presence of undissolved calcium or magnesium bases. On cooling, the neutralized polydextrose is readily granulated.

The throughput and economy of the processor can be increased by the addition of small amounts of water to reduce the viscosity of the melted polymer and facilitate mixing and neutralization. The presence of a small amount of water makes it easier to dissolve the polydextrose and the neutralizing agent. Preferably, no more than about 10% by weight water is added. Since pure water would be lost as steam when added to the 300° F. processor, the water is preferably added as an aqueous solution of polydextrose A. For example, after the polydextrose A and the neutralizing agent have been blended, this mixture can be combined in a ratio of 85:15 in the cylinder of the continuous processor with a 70% solution of polydextrose A in water. The extruded product when cooled can still be readily granulated.

The neutralizing agent is added in an amount sufficient to raise the pH of a 10% polydextrose solution at least to about 5. For example, 0.6% by weight calcium hydroxide will bring the pH of a 10% polydextrose solution to about 6.6.

While microcrystalline cellulose has a zero calorie content per gram and is also a preferred bulking agent in the reduced calorie peanut butter products of the present invention, conventional cellulose bulking agents that are commercially available tend to have large surface areas with numerous crevices that capture the oil in oil-based food products. As pointed out above, the more oil that is captured, the higher is the resulting viscosity of the food product. Because commercially available cellulose, alpha-cellulose, micro-fibrillated cellulose, natural fibers, and Avicel ® microcrystalline cellulose have large pourous surface areas, they absorb excessive amounts of oil and are not suitable for use in the reduced calorie peanut butter products of the present invention.

One way to minimize the oil-binding capacity of commercially available microcrystalline cellulose is to agglomerate the submicron constituent particles to form smooth-surfaced aggregates having a substantially increased effective particle size and effectively decreased oil-binding capacity. Preferably, the aggregate particles have a particle diameter of no more than about 35 microns, and most preferably less than about 22 microns, so as to avoid imparting grittiness to the reduced calorie peanut butter product. Aggregate microcrystalline cellulose particles of this size not only absorb less oil, they also impart less of an astringent sensation when used in the reduced calorie peanut butter products described herein. In addition, to further reduce the possibility that the microcrystalline cellulose particles will absorb oil, preferably only particle sizes larger than about 5 microns are used in the reduced calorie peanut butter products of the present invention. For this same reason, it is preferred that the amount of microcrystalline cellulose be limited to about 20% by weight, and most preferably to about 10% by weight.

As noted above, the solid bulking agents may be added alone or combined together. For example, if it is desired to use a mixture of polydextrose and microcrystalline cellulose, the polydextrose is preferably used in an amount from about 7 to about 27% by weight, and the microcrystalline cellulose is preferably used in an amount up to about 20% by weight, and most preferably up to about 10% by weight.

The examples that follow provide a more detailed description of the present invention. These examples are, however, merely illustrative and are not intended as a limitation of the scope of the invention.

EXAMPLE 1

Peanut Spread Having 25% Fewer Calories

| Ingredient | Grams | Calories |
| --- | --- | --- |
| Roasted Peanuts | 62.0 | 358[3] |
| Powdered Polydextrose CM[1] | 25.0 | 25 |
| Sugar; Powered | 5.0 | 20 |
| Salt; Fine Form | 1.0 | 0 |
| Protein Supplement[2] | 5.0 | 17 |
| Hydrogenated Vegetable Oil | 1.3 | 11 |
| Other Nutritional Supplements | 0.7 | 0 |
| Totals | 100.0 | 431 |

[1]As used herein, CM means neutralized by a neutralizing agent selected from the group consisting of calcium hydroxide, calcium carbonate, calcium oxide, magnesium hydroxide, magnesium carbonate, and magnesium oxide.
[2]As used herein, Protein Supplement includes the supplementary materials described in U.S. Pat. No. 3,216,830.
[3]The factors used to calculate these energy values for peanuts are 3.47 kcal/g for protein, 8.37 kcal/g for fat, and 4.07 kcal/g for carbohydrates (from Composition of Foods: Nut and Seed Products by the Nutrition Monitoring Division, United States Department of Agriculture, revised September, 1984). A nitrogen-to-protein conversion factor of 6.25 was used for the reduced calorie peanut butter spreads in Example 1, 3 and 4 (21 CFR Section 102.23(c)).

The reduced calorie peanut spread of Example 1 is prepared by roasting peanuts to the desired flavor and color and then coarsely grinding them. The remaining dry ingredients are added to the coarsely ground peanuts at a rate sufficient to maintain the flowability of the material while the temperature is kept between about 150° to about 180° F. As the dry ingredients are added, the mixture is recirculated through a mill to reduce the size of the particles comprising the ground paste and to liberate more oil. Hydrogenated vegetable oil is preferably added to this mixture. The process following the combination of ingredients is well known to those skilled in the art.

"Other Nutritional Supplements" includes those nutrients necessary to meet the standards of the Food and Drug Administration identity of peanut spreads set forth in 21 CFR Section 102.23(b). These vitamin, mineral, protein and/or amino acids may be needed to label the reduced calorie peanut butter product of Example 1 as a "peanut spread" since peanut spreads must be nutritionally equivalent to peanut butter.

Those skilled in the art are able to adjust the filling conditions and formulations to obtain the desired consistency within the range of commercial peanut butters. Penetrometer values (an analytical measurement of consistency) determined that the consistency of commercial peanut butters and of the reduced calorie peanut spread of Example 1 was the same.

The peanut butter product described in Example 1 has been tested by consumer sensory panels. The panel rated the product 7.56 on a 9 point hedonic scale. This value falls between 7.0 "like moderately" and 8.0 "like very much." After 105 days of storage, the same product was rated by a similar consumer panel as 7.14.

A reduced calorie peanut butter product having one-third fewer calories can also be made using the same ingredients set forth in Example 1. If nutritional supplementation similar to that set forth in Example 1 is used, the resulting reduced calorie peanut butter product can be labelled a peanut spread. If no claim of nutritional equivalency is to be made, then a reduced calorie imitation peanut butter of the following formulation would result:

EXAMPLE 2

Imitation Peanut Butter Having 33% Fewer Calories

| Ingredient | Grams | Calories |
|---|---|---|
| Peanuts | 49.7 | 288[1] |
| Peanut Oil | 3.0 | 25 |
| Polydextrose CM | 40.0 | 40 |
| Sugar; Powdered | 5.0 | 20 |
| Salt; Fine Form | 1.0 | 0 |
| Stabilizer | 1.3 | 0 |
| Totals | 100.0 | 384 |

[1] A nitrogen-to-protein conversion factor of 5.46 was used for the reduced calorie imitation peanut butter of Example 2 (from Composition of Foods: Nut and Seed Products by the Nutrition Monitoring Division, United States Department of Agriculture, revised September, 1984).

The process for combining these ingredients is essentially the same as that described in Example 1.

Combinations of polydextrose CM and microcrystalline cellulose may also be utilized. Since polydextrose and microcrystalline cellulose have different sensory characteristics, blends of these two bulking agents may provide textural and flavor attributes more suitable to some consumers than those provided by individual bulking agents. One such reduced calorie peanut butter product judged to be substantially comparable to a commercial peanut butter in texture by a trained sensory panel had the following formulation:

EXAMPLE 3

Peanut Spread Having 25% Fewer Calories

| Ingredient | Grams | Calories |
|---|---|---|
| Roasted Peanuts | 62.0 | 358 |
| Polydextrose CM | 20.0 | 20 |
| Microcrystalline cellulose | 5.0 | 0 |
| Sugar; Powdered | 5.0 | 20 |
| Salt; Fine Form | 1.0 | 0 |
| Hydrogenated Vegetable Oil | 1.3 | 11 |
| Protein Supplement | 5.0 | 17 |
| Other Nutritional Supplements | 0.7 | 0 |
| Totals | 100.0 | 426 |

Chunky type peanut butter products in which peanut bits about ⅛" in size are incorporated in a smooth peanut butter-type base can also be made by this process. For example, a chunky peanut spread containing 25% fewer calories can be formulated as follows:

EXAMPLE 4

Chunky Peanut Spread with 25% Fewer Calories

| Ingredient | Grams | Calories |
|---|---|---|
| Roasted Peanuts, Ground | 42.3 | 243 |
| Roasted Peanuts, Granular | 20.0 | 115 |
| Polydextrose CM | 25.0 | 25 |
| Sugar; Powdered | 5.0 | 20 |
| Salt; Fine Form | 1.0 | 0 |
| Protein Supplement | 5.0 | 17 |
| Hydrogenated Vegetable Oil | 1.0 | 8 |
| Other Nutritional Supplements | 0.7 | 0 |
| Totals | 100.0 | 428 |

All the ingredients except for the granular roasted peanut bits are combined as described in Example 1. The granular peanuts are added prior to filling but after the initiation of crystallization by combining and mixing measured amounts of the creamy base with the granular peanuts until a homogeneous distribution is obtained. This is followed by filling in jars.

While the preferred embodiment and application of this invention has been shown and described, it would be apparent to those skilled in the art that many more modifications are possible without departing from the inventive concept herein described. The invention, therefore, is to be limited only by the lawful scope of the claims which follow.

What is claimed is:

1. A reduced calorie peanut butter product containing ground non-defatted peanuts and from about 15 to about 40 percent by weight of a solid bulking agent having from 0 to about 3 calories per gram, said bulking agent having an oil-binding capacity from about 20 to about 45 percent, and a particle size less than about 50 microns.

2. A reduced calorie peanut butter product as in claim 1 wherein the solid bulking agent is polydextrose.

3. A reduced calorie peanut butter product as in claim 2 wherein the polydextrose comprises from about 17 to about 27% by weight of the product.

4. A reduced calorie peanut butter product as in claim 2 wherein the polydextrose comprises about 25% by weight of the product.

5. A reduced calorie peanut butter product as in claim 2 wherein the polydextrose comprises about 40% by weight of the product.

6. A reduced calorie peanut butter product as in claim 2 wherein the polydextrose has an average particle size of about 5 to about 13 microns.

7. A reduced calorie peanut butter product as in claim 2 wherein the polydextrose has a particle size from about 5 microns to about 35 microns.

8. A reduced calorie peanut butter product as in claim 2 wherein the polydextrose has been neutralized by a compound containing calcium or magnesium.

9. A reduced calorie peanut butter product as in claim 8 wherein the polydextrose has been neutralized by a neutralizing agent selected from the group consisting of calcium hydroxide, calcium carbonate, calcium oxide, magnesium hydroxide, magnesium carbonate, and magnesium oxide.

10. A reduced calorie peanut butter product as in claim 8 wherein the polydextrose has been neutralized in a melt neutralization process.

11. A reduced calorie peanut butter product as in claim 2 wherein the solid bulking agent comprises a mixture of polydextrose and microcrystalline cellulose.

12. A reduced calorie peanut butter product as in claim 11 wherein the microcrystalline cellulose comprises aggregate particles having a particle size from about 5 microns to about 35 microns.

13. A reduced calorie peanut butter product as in claim 12 wherein the microcrystalline cellulose has an average particle size of about 5 to about 13 microns.

14. A reduced calorie peanut butter product as in claim 11 wherein the microcrystalline cellulose comprises up to about 20% by weight of the product.

15. A reduced calorie peanut butter product as in claim 11 wherein the polydextrose comprises from about 7 to about 27% by weight of the product and the microcrystalline cellulose comprises from about 1 to about 20% by weight of the product.

16. A reduced calorie peanut butter product as in claim 15 wherein the microcrystalline cellulose comprises from about 1 to about 10% by weight of the product.

17. A reduced calorie peanut butter product as in claim 1 wherein the solid bulking agent is microcrystalline cellulose.

18. A reduced calorie peanut butter product as in claim 17 wherein the microcrystalline cellulose comprises from about 15 to about 20% by weight of the product.

19. A reduced calorie peanut butter product as in claim 17 wherein the microcrystalline cellulose comprises aggregate particles having a particle size from about 5 to about 35 microns.

20. A reduced calorie peanut butter product containing ground non-defatted peanuts and a mixture of polydextrose and microcrystalline cellulose in a combined amount of up to about 40 percent by weight, said polydextrose and microcrystalline cellulose having a particle size from about 5 microns to about 35 microns and an oil-binding capacity from about 20 to about 45 percent.

21. A reduced calorie peanut butter product as in claim 20 wherein the polydextrose has been neutralized by a neutralizing agent selected from the group consisting of calcium hydroxide, calcium carbonate, calcium oxide, magnesium hydroxide, magnesium carbonate, and magnesium oxide.

22. A reduced calorie peanut butter product as in claim 20 wherein the polydextrose and the microcrystalline cellulose have an average particle size of about 5 to about 13 microns.

23. A reduced calorie peanut butter product as in claim 20 wherein the polydextrose comprises from about 7 to about 27% by weight and the microcrystalline cellulose comprises from about 1 to about 20% by weight.

24. A reduced calorie peanut butter product as in claim 20 wherein the polydextrose has been neutralized in a melt neutralization process.

25. A reduced calorie peanut butter product containing ground non-defatted peanuts and from about 15 to about 40 percent by weight polydextrose, said polydextrose having been neutralized by a compound containing calcium or magnesium, having a particle size from about 5 microns to about 35 microns, and having an oil-binding capacity from about 20 to about 45 percent.

26. A reduced calorie peanut butter product as in claim 25 wherein the polydextrose has an average particle size of about 5 to about 13 microns.

27. A reduced calorie peanut butter product as in claim 25 wherein the polydextrose has been neutralized by a neutralizing agent selected from the group consisting of calcium hydroxide, calcium carbonate, calcium oxide, magnesium hydroxide, magnesium carbonate, and magnesium oxide.

28. A reduced calorie peanut butter product as in claim 25 wherein the polydextrose has been neutralized in a melt neutralization process.

29. A reduced calorie peanut butter product containing ground non-defatted peanuts and a solid bulking agent wherein the solid bulking agent comprises from about 7 to about 27 percent by weight polydextrose having a particle size from about 5 microns to about 35 microns and from about one percent to about 20 percent by weight microcrystalline cellulose having a particle size from about 5 microns to about 35 microns, said polydextrose having been neutralized by a compound containing calcium or magnesium, and said microcrystalline cellulose comprising aggregate particles having an oil-binding capacity from about 20 to about 45 percent.

30. A reduced calorie peanut butter product as in claim 29 wherein the polydextrose has been neutralized in a melt neutralization process.

31. A reduced calorie peanut butter product containing ground non-defatted peanuts and about 25 percent by weight polydextrose having a particle size from about 5 microns to about 35 microns and an oil-binding capacity from about 20 to about 45 percent, said polydextrose having been neutralized by a neutralizing agent selected from the group consisting of calcium hydroxide, calcium carbonate, calcium oxide, magnesium hydroxide, magnesium carbonate and magnesium oxide.

32. A reduced calorie peanut butter product containing ground non-defatted peanuts and about 40 percent by weight polydextrose having a particle size from about 5 microns to about 35 microns and an oil-binding capacity from about 20 to about 45 percent, said polydextrose having been neutralized by a neutralizing agent selected from the group consisting of calcium hydroxide, calcium carbonate, calcium oxide, magnesium hydroxide, magnesium carbonate and magnesium oxide.

* * * * *